United States Patent
Henderson et al.

(10) Patent No.: US 6,683,888 B1
(45) Date of Patent: Jan. 27, 2004

(54) METHOD AND APPARATUS FOR ESTABLISHING MODEM CONNECTIONS OVER A PACKET NETWORK

(75) Inventors: P. Michael Henderson, Tustin, CA (US); Royce L. Payne, Longmont, CO (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 10/280,768

(22) Filed: Oct. 25, 2002

Related U.S. Application Data

(63) Continuation of application No. 09/405,583, filed on Sep. 27, 1999, now Pat. No. 6,493,355.

(51) Int. Cl.[7] .................................................. H04J 3/16
(52) U.S. Cl. ...................................... 370/468; 370/522
(58) Field of Search ................................ 370/466–469, 370/522–526, 465; 522/241; 526/292; 523/352; 465/389–395, 401; 379/3, 93.5, 100.17, 93.6, 413, 93.7, 142.13, 142.15, 189, 96, 95.5; 455/555, 417, 416, 428, 413; 375/222, 224, 223, 225, 326, 324, 354, 355; 222/93.5; 225/93.6, 100.17

(56) References Cited

U.S. PATENT DOCUMENTS

| | | | |
|---|---|---|---|
| 5,146,472 A | * | 9/1992 | Hallman ...................... 375/222 |
| 5,353,341 A | | 10/1994 | Gillis et al. |
| 5,450,438 A | * | 9/1995 | Landry et al. ............... 375/222 |
| 5,493,609 A | * | 2/1996 | Winseck, Jr. et al. ..... 379/93.08 |
| 5,754,589 A | | 5/1998 | Maitra et al. |
| 5,864,560 A | * | 1/1999 | Li et al. ...................... 370/465 |
| 5,875,233 A | | 2/1999 | Cox |
| 5,956,323 A | * | 9/1999 | Bowie ......................... 370/241 |
| 5,956,485 A | | 9/1999 | Perlman |
| 6,078,645 A | * | 6/2000 | Cai et al. ......................... 379/3 |
| 6,178,170 B1 | | 1/2001 | Duree et al. |
| 6,243,580 B1 | * | 6/2001 | Garner ........................ 455/428 |
| 6,275,573 B1 | | 8/2001 | Naor et al. |
| 6,320,867 B1 | | 11/2001 | Bellenger et al. |
| 6,320,948 B1 | * | 11/2001 | Heilmann et al. .......... 379/189 |
| 6,359,896 B1 | | 3/2002 | Baker et al. |
| 6,493,355 B1 | * | 12/2002 | Henderson et al. ......... 370/468 |
| 6,501,790 B1 | * | 12/2002 | Livshin ....................... 375/222 |
| 6,560,321 B1 | * | 5/2003 | Chen et al. ............. 379/100.17 |

\* cited by examiner

Primary Examiner—Kwang Bin Yao
Assistant Examiner—Prenell Jones
(74) Attorney, Agent, or Firm—Farjami & Farjami LLP

(57) ABSTRACT

A packet-based or cell-based data communication system is capable of determining whether a new call is a modem call or a voice call before a modem connection is established between the two end devices. The network switches are configured to monitor for distinctive facsimile modem and data modem calling and answer signals. In response to the detection of such calling or answer signals, the data communication system selects a speech coding scheme and/or a data transmission technique for use in connection with the current call, while a conventional 64 kbps PCM transmission scheme is maintained for communications between the network and the end devices. A speech coding protocol, such as ADPCM, may be enabled for voice calls, thus conserving network bandwidth. The 64 kbps PCM scheme may be employed to facilitate high speed modem transmissions.

40 Claims, 4 Drawing Sheets

METHOD AND APPARATUS FOR ESTABLISHING MODEM CONNECTIONS OVER A PACKET NETWORK

The present application is a continuation application of U.S. application Ser. No. 09/405,583, filed Sep. 27, 1999 now U.S. Pat. No. 6,493,355, which is hereby incorporated by reference.

FIELD OF THE INVENTION

The present invention relates generally to data communication systems. More particularly, the present invention relates to a technique for the flexible implementation of speech coding in a data communication network in a manner that facilitates voice transmissions, data modem transmissions, and facsimile modem transmissions.

BACKGROUND OF THE INVENTION

The public switched telephone network (PSTN) is primarily used to transmit bi-directional voice calls between two end users. In recent years, particularly with the increasing popularity of the Internet, the PSTN has become a universal system that handles voice calls, data modem calls, facsimile modem calls, and other calls. The data transmission scheme and certain operational parameters may vary from connection to connection, depending upon the specific type of information being transmitted during the current communication session. For example, a relatively low data rate may suffice in the context of conventional voice calls, while a relatively high data rate may be desired for certain data modem applications.

The conventional PSTN is a circuit switched network that transmits data at a rate of 64,000 bits per second (64 kbps). In accordance with well known techniques, the PSTN utilizes pulse code modulation (PCM) techniques to transmit voice calls; ITU-T Recommendation G.711 (November 1988) sets forth the functional requirements for such 64 kbps PCM transmissions. The entire content of Recommendation G.711 is incorporated by reference herein. Although voice calls can be adequately handled via the G.711 scheme, a number of speech coding techniques may be employed to conserve bandwidth resources associated with the transmission of voice calls without sacrificing the quality of the voice transmission. For example, ITU-T Recommendation G.726 (December 1990) sets forth an adaptive differential pulse code modulation (ADPCM) scheme that may be used in the context of voice calls. The G.726 ADPCM technique effectively reduces the normal PSTN data rate from 64 kbps to 40 kbps, 32 kbps, 24 kbps, or 16 kbps. As another practical example, ITU-T Recommendation G.728 (September 1992) sets forth a speech coding methodology that effectively reduces the normal PSTN data rate to 16 kbps using linear prediction techniques. Other speech coders that may be utilized in this context (and in the context of the present invention) are set forth in ITU-T Recommendation G.723.1 and ITU-T Recommendation G.729a. The G.723.1 Recommendation contemplates a 5.3 kbps data rate and a 6.3 kbps data rate, while the G.729a Recommendation contemplates an 8 kbps data rate. The entire contents of Recommendations G.726, G.728, G.723.1, and G.729a, along with any related appendices, attachments, and summaries, are incorporated by reference herein.

The PSTN rarely uses ADPCM or other speech coding techniques because such techniques can be detrimental to data and facsimile modem transmissions. Although ADPCM-encoded speech sounds essentially identical to PCM-encoded speech, modem signals, both fax and data signals, are sensitive to the coding effects of ADPCM and suffer performance degradation compared to operation over G.711. Consequently, the performance of a modem system suffers in the context of an ADPCM channel; the data rate may be reduced by up to fifty percent. Thus, in response to the universal application of the PSTN as a conduit for voice, facsimile, and data calls, and in an effort to satisfy modem users seeking high data rates, the traditional 64 kbps PCM scheme is often employed as the primary transmission protocol within the PSTN.

In view of the circuit switched nature of PSTN calls, conventional data communication systems are not able to determine, a priori, whether a new call conveys voice information, data modem information, or facsimile modem information. Accordingly, G.711 is conventionally used when a call is established in the PSTN regardless of whether the call is a voice call or a modem call. Furthermore, the PSTN architecture is configured such that the circuit is fixed for the duration of the call. Consequently, if the call is a modem call and ADPCM encoding is present in the communication channel, then the modem transmission speed will inevitably suffer. Conversely, if the call is a voice call and speech coding is not utilized in the channel, then network resources, e.g., bandwidth, may be wasted.

Prior art data communication systems may handle some intercontinental facsimile calls in a manner that addresses the effects of speech coding. This technique is commonly referred to as demod/remod. The demod/remod technique is typically utilized for facsimile transmissions across communication channels, e.g., submarine cables, that employ ADPCM encoding. As discussed above, facsimile transmissions may be adversely affected by an ADPCM channel. In accordance with the demod/remod scheme, the call is initially established such that the end devices can transmit their respective call and answer signals. If a facsimile calling tone is detected, then intermediate facsimile modems are "inserted" into the connection at the ends of the ADPCM channel. Notably, the activation of the intermediate facsimile modems occurs before the end devices begin any training procedures. The intermediate facsimile modems are configured to communicate with each other over the ADPCM channel and with the respective end devices. Accordingly, the calling side intermediate modem informs the answer side intermediate modem that a facsimile call is being placed to a certain telephone number.

Once the facsimile modem connection is initialized between the answer side intermediate facsimile modem and the destination modem device, the calling side intermediate facsimile modem establishes a compatible connection with the originating modem device. Thus, the facsimile data is transmitted between the originating modem device and the calling side intermediate facsimile modem (and between the answer side intermediate facsimile modem and the destination modem device) at a relatively high data rate in accordance with the G.711 protocol. In contrast, the facsimile data can be transmitted over the ADPCM channel at a relatively low data rate, e.g., 9.6 kbps, in accordance with conventional facsimile modem methodologies. In this manner, ADPCM channel resources may be allocated in a more efficient manner.

Although the demod/remod technique can be employed to reduce the amount of traffic across an ADPCM link, the technique only works in connection with facsimile modem transmissions because facsimile calls can be identified by a distinct calling tone. In addition, the demod/remod technique can add a significant amount of delay to the connection time and to the overall facsimile transmission time. Notably, the demod/remod procedure is not applicable to data modem calls, where a high data rate (e.g., a rate higher than the maximum rate attainable for an ADPCM channel) is often desired.

SUMMARY OF THE INVENTION

A data communication system according to the present invention is capable of flexibly configuring itself to handle voice calls, data modem calls, and facsimile modem calls in a manner that conserves network bandwidth resources. The data communication system detects the type of information to be conveyed by the current call such that an appropriate data transmission scheme can be utilized for the current call. In a practical embodiment, a 64 kbps transmission protocol, such as the G.711 PCM protocol, may be used for data modem calls to facilitate a relatively high data rate. In contrast, speech coding techniques may be utilized for voice calls to conserve bandwidth resources associated with the communication network. Unlike some prior art methodologies that are limited to facsimile applications, the techniques of the present invention can be employed to dynamically alter the data transmission scheme for voice calls and modem calls.

The above and other aspects of the present invention may be carried out in one form by a data communication system having a calling device, an answer device, and a transmission network capable of dynamically allocating bandwidth resources for purposes of transmitting calls. The transmission network includes an interface component configured to convert from a first data coding technique associated with the calling device to a second data coding technique utilized by the transmission network. The data coding conversion is performed during the initialization of a call and is performed in response to the type of call, e.g., a voice call, a data modem call, or a facsimile modem call.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF A PREFERRED ILLUSTRATIVE EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

It should be appreciated that the particular implementations shown and described herein are illustrative of the invention and its best mode and are not intended to otherwise limit the scope of the present invention in any way. Indeed, for the sake of brevity, conventional techniques for signal processing, data transmission, signaling, network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
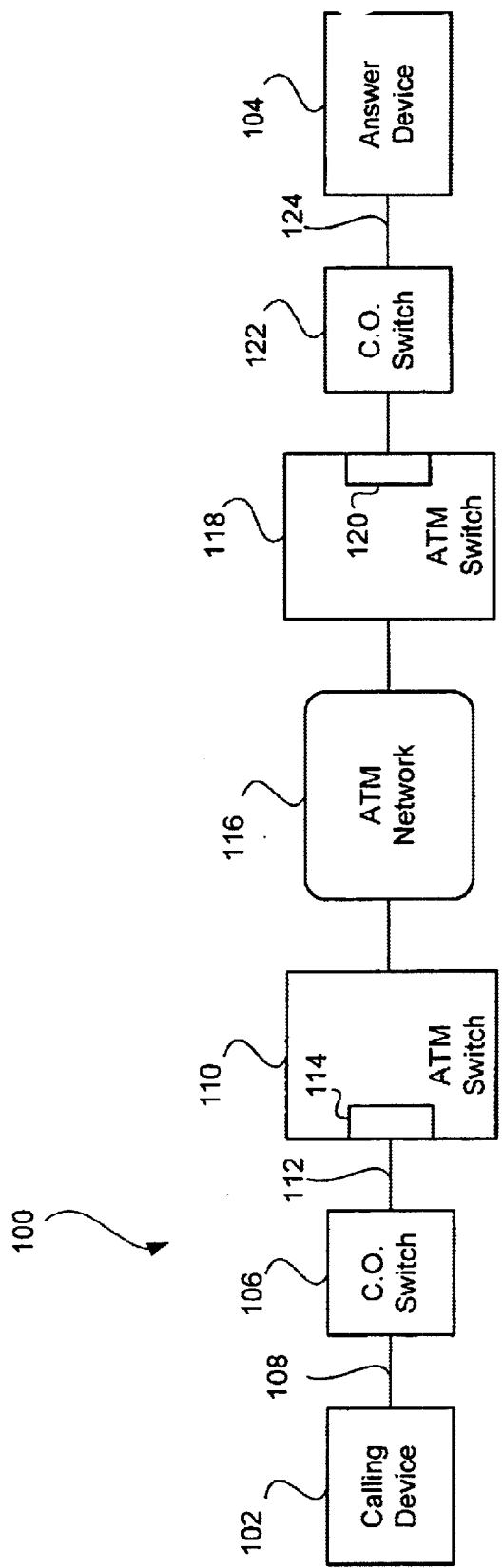
FIG. 1 is a schematic-block diagram of a data communication system according to a practical embodiment of the present invention.

The present invention may be utilized in the context of any suitable data communication network that is capable of dynamically allocating operating bandwidth in response to the current traffic demand or other operating parameters of the network. The available bandwidth resources and the corresponding data transmission capacity for a practical network are limited. Accordingly, the dynamic allocation of bandwidth resources may be utilized by such networks to handle calls in an efficient manner. Such communication networks include asynchronous transfer mode (ATM) networks, Internet Protocol (IP) networks, frame relay networks, and any packet-based or cell-based data transmission network. Referring to FIG. 1, a data communication system 100 according to the present invention is depicted in schematic block diagram form. In accordance with one practical embodiment, data communication system 100 is based upon an ATM network architecture. However, the ATM aspect of data communication system 100 is not intended to restrict the application of the present invention in any way. Indeed, as mentioned above, data communication system 100 may operate in conjunction with any number of conventional communication systems or any number of suitable communication systems that may be developed in the future.

Data communication system 100 may be generally configured to transmit data from a first device, e.g., a calling device 102, to a second device, e.g., an answer device 104. In a practical embodiment, each of devices 102 and 104 may be realized as a telephone device, a facsimile modem device, a data modem device, a videophone device, or any combination thereof. In this respect, devices 102 and 104 may be suitably configured for compatibility with any number of the following (and other) conventional protocols for data modem transmissions, facsimile modem transmissions, and the like: V.90, V.34, V.17, V.29, and V.27ter (these protocols are published by the International Telecommunication Union). The prior art is replete with such devices, whether wired, cordless, or cellular; the detailed operation and configuration of such devices will not be described herein. Indeed, the present invention is particularly desirable because devices 102 and 104 may be configured in a conventional manner; no modifications are necessary for devices 102 and 104 to function in accordance with the present invention.

Calling device 102 may place a call to answer device 104 in a conventional manner in response to a user input or a computer-generated input. For example, a conventional voice call may be initiated manually by a user of a telephone device, a facsimile modem call may be prompted manually by a user of a facsimile machine or automatically by the facsimile machine itself, and a data modem call may be initiated by a user of a personal computer or by a software application associated with a personal computer. In the context of the present invention, calling device 102 and/or answer device 104 may be a distinct physical component (such as a telephone set, a stand-alone facsimile machine, or a peripheral modem device), a component integral to a host system (such as a modem or telecommunication card for a personal computer), or a software application run by a host system (such as a software-based modem application associated with a personal computer).

A call initiated by calling device 102 may be routed to a local central office 106 via an analog local loop 108. The portion of system 100 between calling device 102 and central office 106 may utilize conventional analog transmission techniques. Central office 106 may be designed to perform circuit switching and call processing in accordance with any number of known methodologies. In accordance with the conventional manner in which many telecommunication systems are viewed, central office 106 may be considered to be part of the PSTN (which may be assumed to be a fully digital network). Accordingly, an analog to digital conversion may occur at central office 106 such that the information communicated from calling device 102 is suitably converted for transmission in accordance with a digital transmission scheme, e.g., in accordance with the conventional G.711 PCM scheme.

The call is eventually routed from central office 106 to an ATM switch 110, which is preferably configured in accordance with ATM principles and technologies that are well known to those skilled in the art. Central office 106 is preferably coupled to ATM switch 110 via a high speed digital connection 112, e.g., an optical fiber line, operating at rates of OC-1 or higher. In this respect, ATM switch 110 may function as an interface between central office 106, which may use time division multiplexing techniques, and ATM network 116, which is a packet-based or cell-based network.

For the sake of brevity, the details of ATM are not described herein. Such details may be found in a variety of reference materials, such as ATM THEORY AND APPLICATIONS, by McDysan and Spohn (McGraw-Hill, 1999). The entire content of this publication is incorporated by reference herein. As described above, any number of packet-based or cell-based data transmission schemes may be employed in the context of the present invention, and the description of ATM herein is not intended to limit the scope of the present invention. Indeed, a suitable alternate embodiment may instead utilize an IP router for compatibility with an IP network, a frame relay switch for compatibility with a frame relay network, or the like. In general terms, data communication system 100 may employ any appropriate switching component that operates in conjunction with the particular data transmission network.

In accordance with the preferred embodiment, ATM switch 110 includes or is operationally associated with an interface component 114 that is configured to convert from one data coding scheme, technique, or protocol to a different data coding scheme, technique, or protocol in response to the current call type. For example, interface component 114 may be adapted to convert an incoming PCM voice call transmitted at 64 kbps (e.g., in accordance with ITU-T Recommendation G.711) to an outgoing ADPCM call transmitted at 32 kbps (e.g., in accordance with ITU-T Recommendation G.726). In addition, interface component 114 may be configured to maintain a 64 kbps scheme in response to the detection of a data modem call or a facsimile modem call. Interface component 114 is described in more detail below in connection with FIG. 2.

ATM switch 110 processes the information associated with the current call and transmits the information via known ATM techniques. In the context of this illustrative embodiment, ATM switch 110 generates ATM cells for transmission through an ATM network 116. In accordance with known techniques, the ATM cells are routed over "virtual circuits" through any number of intervening ATM switches until the cells arrive at a destination ATM switch 118. ATM switch 118 may be similar in form and function to ATM switch 110. In a practical embodiment, ATM switch 118 may also include or be functionally associated with an interface component 120. Interface component 120 may be configured similar to interface component 114. Thus, interface component 120 is capable of converting from a data coding technique utilized by ATM network 116 to another data coding scheme utilized by a destination central office 122 and/or by answer device 104.

Although depicted as such in FIG. 1, interface components 114 and 120 need not be resident at their respective central offices. Indeed, interface component 114 may be physically realized at central office 106, at a junction between central office 106 and ATM switch 110, or at any suitable location within ATM network 116. Interface component 114 may be a physically distinct element or it may be integrated into any number of physical components associated with data communication system 100. Likewise, interface component 120 may be realized at any number of alternative locations or be integrated into different physical components. Although a wireless implementation may not be a practical implementation at this time, the techniques of the present invention need not be limited to a wired system.

In a practical embodiment that contemplates international communications, the international exchange carrier may implement the present invention by replacing a SONET time division multiplexed (TDM) channel with an ATM channel. In this manner, the data transmitted via the ATM channel may be encoded and passed across the ATM link (using, e.g., ATM Adaptation Layer 2 (AAL2) or AAL1) to enable the international exchange carrier to realize a bandwidth savings of up to fifty percent over a typical SONET channel.

Central office 122 may function in a similar manner as central office 106. Accordingly, central office 122 is capable of performing circuit switching to route the call to answer device 104 via, e.g., an analog local loop 124. As described above in the context of central office 106, central office 122 is capable of converting a 64 kbps PCM signal into a conventional signal suitable for transmission over local loop 124. In this manner, an end-to-end connection may be established between calling device 102 and answer device 104.

Although not shown in FIG. 1, data communication system 100 may include any number of calling devices associated with central office 106 and any number of answer devices associated with central office 122. In addition, ATM switches 110 and 118 may support a plurality of central offices. Accordingly, interface components 114 and 120 may be suitably configured as multichannel devices. In this manner, system 100 is capable of transmitting different types of calls between any number of calling and answer devices. As described above, the flexible nature of interface components 114 and 120 allows system 100 to dynamically allocate bandwidth resources according to current user demands and according to the types of calls being transmitted.

Figure 2:
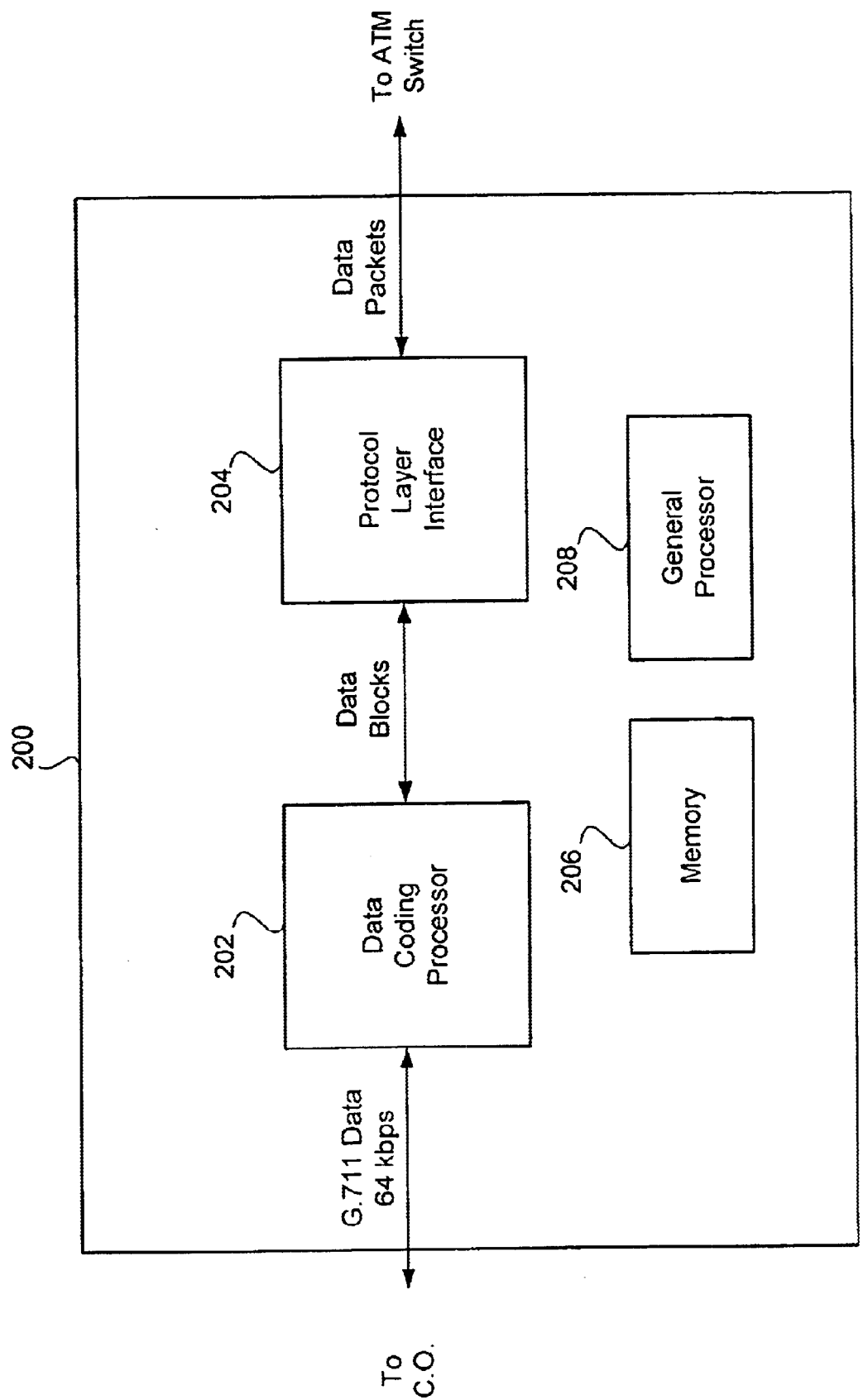
FIG. 2 is a schematic block diagram of an interface component that may be utilized in the data communication system shown in FIG. 1.

FIG. 2 is a schematic block diagram of an illustrative interface component 200 that may be utilized in data communication system 100. Interface components 114 and 120 may be realized by interface component 200, or a functional equivalent thereof. Additional details of the functionality of interface component 200 are described below in connection with FIG. 3 and in connection with the process shown in FIG. 4.

Interface component 200 may generally include a data coding processor 202 and a protocol layer interface 204. Interface component 200 may also include, be coupled to, or be operatively associated with a memory element 206 and a general processor element 208. Memory element 206 and processor element 208 may be configured to cooperate with any of the other elements of interface component 200. For the sake of clarity, FIG. 2 does not show connecting lines associated with memory element 206 or processor element 208.

Processor element 208 may be realized by a suitable digital signal processing component that is configured to operate in conjunction with other elements of interface component 200, and/or in conjunction with suitable software instructions, to carry out the various processing tasks described herein. In addition to the specific operations described herein, processor element 208 may be configured to carry out various tasks associated with the operation of the data communication system. Accordingly, processor element 208 may be realized by a processor associated with a network switch, e.g., an ATM switch, a central office, or any suitable processor contained in the data communication system. Indeed, interface component 200 may incorporate any number of processors and/or control elements as necessary to support its functionality. Such processor and control elements may suitably interact with other functional components of interface component 200 to thereby access and manipulate data or to monitor and regulate the operation of interface component 200.

Interface component 200 also includes (or is operatively associated with) a suitable amount of memory 206 necessary to support its operation. Memory element 206 may be a random access memory, a read only memory, or a combination thereof. Memory element 206 may be configured to store information utilized by interface component 200 in connection with one or more processes related to the present invention, as described in more detail below. To this end, interface component 200 may employ any number of conventional memory elements; the fundamental operation of such memory elements, which are generally well known in the art, will not be described in detail herein.

Data coding processor 202 is configured to receive data from a suitable source, e.g., a central office. In most conventional systems, data is transmitted by a central office in accordance with the G.711 scheme. In other words, such data is transmitted isochronously as digital data at a rate of 64 kbps. Data coding processor 202 may encode the incoming data in a suitable manner according to the needs of the system. In the context of the preferred embodiment, data coding processor 202 is capable of performing any number of speech coding techniques such as G.726 ADPCM, G.728, or the like. In addition, data coding processor 202 is preferably configured to disable speech coding in a dynamic manner depending upon the current call type and/or other operational parameters of the data communication system.

In accordance with the illustrative embodiment, data coding processor 202 is further configured to reformat the incoming data into suitable data blocks for communication to protocol layer interface 204. In turn, protocol layer interface 204 may be configured to reformat the data blocks into suitable data packets for communication to the network switch, e.g., an ATM switch. In the context of system 100, protocol layer interface 204 may employ an ATM Adaptation Layer (such as AAL1, AAL2, or AAL5) to facilitate compatibility with ATM network 116. Protocol layer interface 204 may be suitably configured to generate control signals, data signals, packets, cells, or the like, for use by the network switch or for use by the communication network itself. Similarly, protocol layer interface 204 may be configured to receive control signals, data signals, packets, cells, or the like, from the network switch. In a practical embodiment, protocol layer interface 204 functions cooperatively with the network switch to thereby enhance the performance of the network switch and to enable the data communication system to allocate network resources in an efficient manner.

Figure 3:
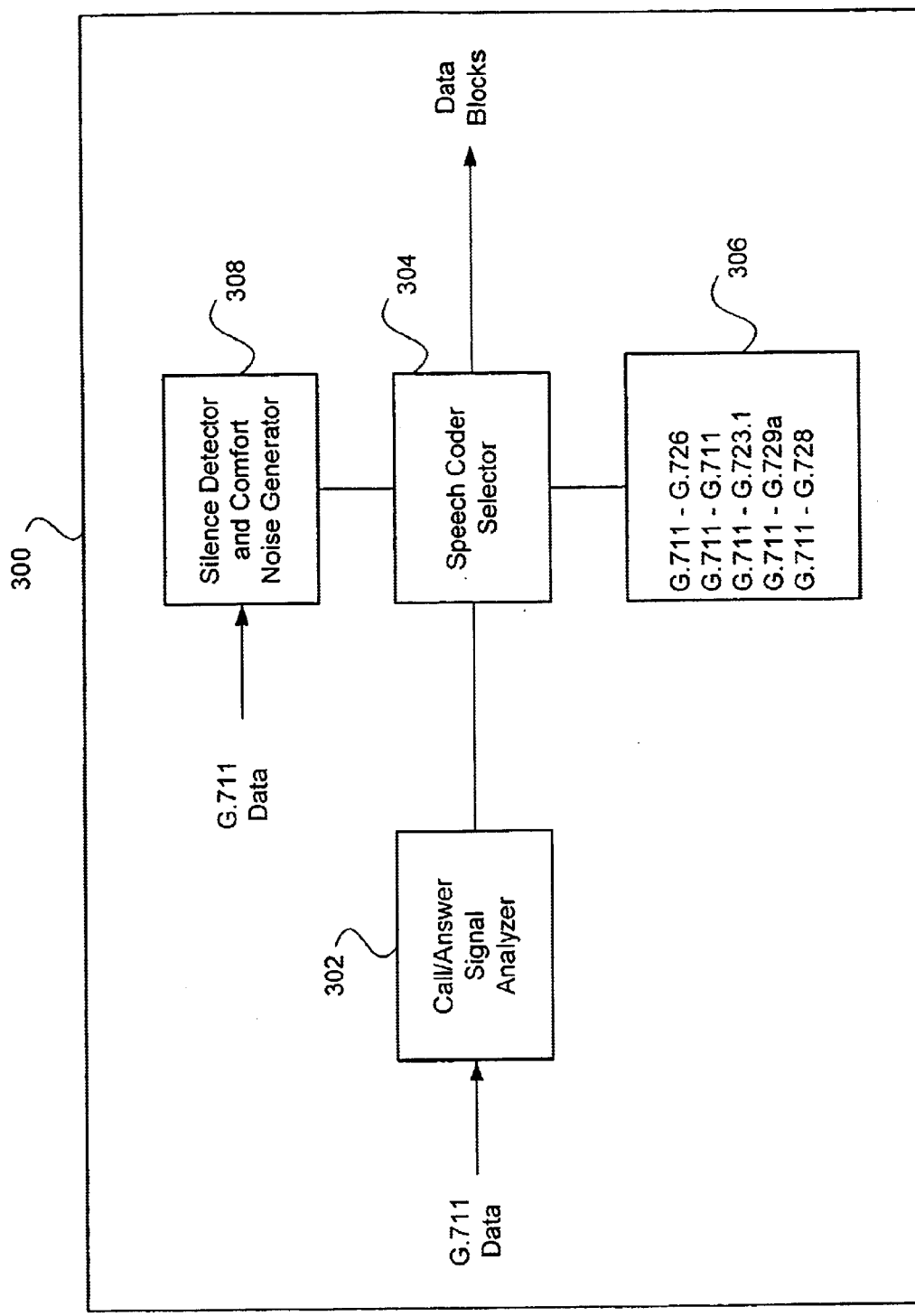
FIG. 3 is a schematic block diagram showing portions of a speech coding processor element that may be utilized in the interface component shown in FIG. 2.

FIG. 3 is a block diagram showing portions of a speech coding processor element (speech coder) 300 that may be utilized in the interface component shown in FIG. 2. As described above, data coding processor 202 may be suitably configured to function in accordance with a number of speech coding techniques, as illustrated by speech coder 300. In addition to the functional elements shown in FIG. 3, speech coder 300 may include any number of elements to enable it to suitably handle the transmission of upstream and downstream data via the associated network switch. Speech coder 300 may generally include a call/answer signal analyzer 302, a speech coder selector 304, a speech coder database 306, and a silence detector and comfort noise generator element 308.

As mentioned above, interface component 200 is capable of receiving data in the downstream or upstream direction. In this context, downstream data is transmitted from a calling device to an answer device, while upstream data is transmitted from an answer device to a calling device. Call/answer signal analyzer 302 is preferably capable of receiving a calling signal, an answer signal, and/or any number of startup signals in response to the initialization of a new call. For example, the present invention contemplates that different types of calls may have distinguishable calling signals and/or distinguishable answer signals associated therewith. Accordingly, call/answer signal analyzer 302 is capable of receiving such calling and answer signals in an appropriate manner. In this respect, call/answer signal analyzer 302 may include or cooperate with a suitably configured receiver that is compatible with different modulation, encoding, and data transmission schemes that govern the format and generation of such calling and answer signals. As shown in FIG. 3, call/answer signal analyzer 302 preferably receives G.711 PCM data (rather than encoded or compressed data) because the relatively high fidelity characteristic of G.711 data enables call/answer signal analyzer 302 to effectively detect calling and answer signals.

For compatibility with different startup signals, call/answer signal analyzer 302 may be configured to receive any number of the following signals:

1. The facsimile modem call tone (CNG) set forth in ITU-T Recommendation T.30;
2. Any data modem call tone (CT) set forth in ITU-T Recommendation V.25;

3. The modem answer tone (ANS) set forth in ITU-T Recommendation V.25;
4. The modem answer tone (ANSam) set forth in ITU-T Recommendation V.8;
5. Any calling or answer signal set forth in any published ITU-T Recommendation; and
6. Any calling or answer signal that may be utilized by the calling device or the answer device.

The details of such calling and answer signals set forth in Recommendations T.30, V.25, and V.8, and any related annexes or supplements, are incorporated by reference herein. Such Recommendations (and other publications known to those skilled in the art) set forth the format and configuration of such signals in detail, and the prior art is replete with various techniques for receiving and detecting such signals. For the sake of brevity, these known technical details will not be described herein.

In some situations, e.g., for voice calls or for some data modem calls, no calling signal or tone is generated. Consequently, if interface component 200 is located at the originating end, then the initialization of the call may be processed in a substantially conventional manner such that the call is passed on to the network switch associated with the destination end. The corresponding interface component 200 at the destination end may then be utilized to monitor for a distinguishable answer signal that indicates the call type of the current call. Alternatively, the corresponding interface component 200 at the originating end may be used to detect the answer signal. In certain situations, e.g., where an aggressive speech coder is enabled, some calling tones and/or answer tones may not be capable of being transmitted through the network. Accordingly, the respective interface components (or respective network switches) may be suitably configured to exchange signals that indicate the presence of such calling and/or answer tones.

Speech coder selector 304 may be responsive to a determination made by call/answer signal analyzer 302. Accordingly, in response to the current call type, selector 304 may cause interface component 200 to change or confirm the data (speech) coding scheme to be used for the data transmitted over the communication network, e.g., ATM network 116. In a practical implementation, incoming calls to a network switch are PCM-encoded in accordance with ITU-T Recommendation G.711. Furthermore, in a preferred embodiment, speech coder selector designates a certain default speech coding scheme, e.g., 32 kbps ADPCM in accordance with G.726. Accordingly, unless otherwise controlled by speech coder selector 304, the G.711 signals are subjected to G.726 speech coding. This default feature may be implemented based on the assumption that a large percentage of calls will be voice calls rather than modem calls.

If necessary or desirable to do so, speech coder selector 304 may convert the default speech coding scheme to a different speech coding or data transmission scheme for use in connection with outgoing signals to be transmitted over the communication network. To facilitate the coding scheme conversion, speech coder selector 304 may include or be operatively coupled to transmission protocol database 306.

As an example of a practical embodiment, FIG. 3 shows an illustrative database 306 that may support conversions from the G.711 PCM scheme to the G.726 32 kbps ADPCM scheme or to any number of different speech coding techniques. In addition, database 306 illustrates that the G.711 scheme may be maintained for modem calls such that the default speech coder is not enabled. Although not depicted in FIG. 3, database 306 may also include information related to the data rate associated with one or more transmission protocols. For example, G.726 ADPCM may be employed to achieve a variety of data rates; database 306 may include information related to such variations. Of course, database 306 may include any number of entries related to the conversion to other speech coding schemes, data encoding techniques, transmission protocols, or the like; the present invention is not limited by any of the specific coding schemes described herein.

Interface component 200 may utilize silence detector and comfort noise generator element 308 to further conserve transmission bandwidth associated with some voice calls. Silence detector element 308 may utilize known techniques to monitor incoming signals, e.g., the G.711 signals received from a central office, for periods of silence. The G.711 data received by element 308 may be the same G.711 data received by call/answer signal analyzer 302 or it may be related to the G.711 data received by analyzer 302. During the periods of silence, silence detector element 308 (or a suitable element associated therewith) may suitably generate "comfort noise" or an indication that comfort noise is to be reproduced at the remote end. As depicted in FIG. 3, element 308 may be operationally associated with speech coder selector 304 such that data blocks or packets representing silence noise are suitably generated in accordance with the selected speech coder.

The comfort noise generator resident at the other interface component may receive the comfort noise signal and suitably create such noise for transmission to the far end user. The comfort noise emulates quiet white noise or silence so that the user at the other end does not assume that the call has been dropped or disconnected. In this manner, network resources need not be wasted on the transmission of silence (for example, ATM network 116 can efficiently transmit a silence indicator in lieu of actually transmitting packets associated with low audio levels).

Figure 4:
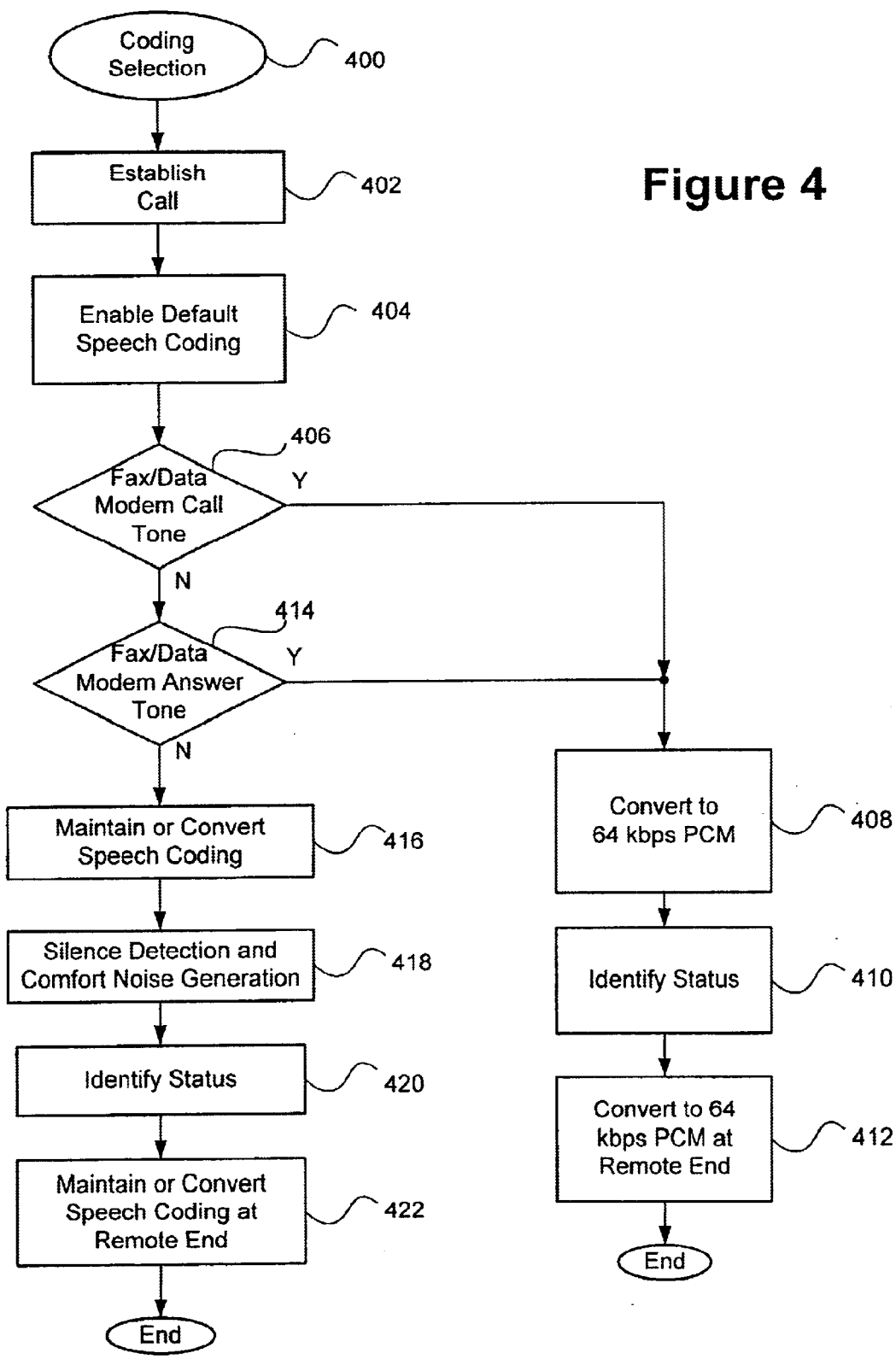
FIG. 4 is a flow diagram of a data coding technique selection process that may be performed by a data communication system configured in accordance with the present invention.

Referring now to FIG. 4, and with continued reference to FIGS. 1–3, an illustrative data coding selection process 400 will be described in the context of data communication system 100 and interface component 200. Process 400 may be performed in response to a call originating from, e.g., calling device 102. For purposes of this example, the call is assumed to be directed to answer device 104. It should be noted that any number of alternative or additional process tasks or steps may be implemented in a practical system during the initialization of a call. Furthermore, a practical data communication system may perform functions that are specific to the primary network transmission technique, e.g., ATM, frame relay, IP, or the like.

Protocol selection process 300 may begin with a task 302, during which a call is established between calling device 102 and answer device 104 in accordance with known techniques. The call may be a voice call, a facsimile modem call, a data modem call, a videophone call, or any suitable data or telecommunication call. In a practical system based on a common telecommunication system, the call is initiated by calling device 102 in accordance with conventional techniques for transmission over the analog local loop 108. At central office 106, the incoming data is converted into a digital signal for transmission in accordance with G.711. In the context of the illustrative system based upon an ATM network, interface component 114 introduces the G.726 (preferably at 32 kbps) speech coder and ATM switch 110 generates ATM packets for transmission to ATM switch 118. In a like manner, the data is processed and transmitted to answer device 104, which answers the call to complete task 402.

As mentioned above, a default speech coder (preferably 32 kbps G.726 ADPCM) is introduced upon establishment of the call or immediately thereafter (task 404). The default speech coder may be automatically "enabled" for new calls such, that no additional control signaling or processing need be performed. Alternatively, the enabling of the default speech coder may be responsive to any number of conventional call establishment signals, control signals, or information exchanged between ATM switches 110 and 118.

As described above, the call will eventually be established between calling device 102 and answer device 104 through ATM network 116. Once the call is initially established, calling device 102 may generate a calling signal and answer device may generate an answer signal. These calling and answer signals may be distinctive for certain types of calls. For example, in accordance with current standardized procedures, facsimile modem calls include a distinctive calling tone that is transmitted during the initialization process. Similarly, some data modem calls may include a calling signal or tone that is distinguishable from facsimile modem calling tones.

In the context of a practical system, a query task 406 may be performed by interface component 114 such that the current call is monitored for the presence of one or more types of calling signals. As described above, call/answer signal analyzer 302 may be utilized for this purpose. As shown in FIG. 4, call/answer signal analyzer 302 may perform query task 406 to determine whether a facsimile or data modem calling tone is present. If query task 406 determines that a facsimile or data modem calling signal is present, then process 400 may proceed to a task 408.

During task 408, interface component 114 converts the downstream data transmission protocol (and/or adjusts the current speech coding scheme) in an appropriate manner. As described above in connection with FIG. 3, task 408 may be performed by speech coder selector 304 in conjunction with database 306. One illustrative downstream transmission protocol for use with facsimile modem calls and data modem calls is the well known G.711 PCM scheme. As described above, the G.711 scheme may be used to obtain data rates at speeds up to 64 kbps. In this respect, task 408 may cause the default speech coder to be disabled such that the G.711 transmission scheme is enabled.

In response to task 408, a task 410 may be performed to cause interface component 114 (or ATM switch 110) to identify the data transmission scheme and/or the speech coding technique protocol to, e.g., the destination ATM switch 118 or the destination interface component 120. For example, interface component 114 may generate one or more ATM cells that convey information related to the transmission protocol to be used by ATM switch 110 for the duration of the call. In response to this identifying data, interface component 120 is suitably converted to utilize the same (or a compatible) data transmission technique and/or the same speech coding scheme in the upstream direction. Any suitable signaling protocol may be utilized by ATM switches 110 and 118 to carry out task 410.

Task 410 may also be configured to identify the presence of the calling signal to ATM switch 118. Such signaling may be desirable if, for whatever reason, the calling signal cannot be effectively transmitted to (or received by) answer device 104. For example, if an aggressive speech coder is implemented, then it may not be possible to process the calling tone in a conventional manner. Accordingly, task 410 may cause ATM switch 110 to generate a number of cells that instruct ATM switch 118 to emulate the calling signal for downstream transmission to answer device 104.

Assuming that interface component 120 is informed that the current call is a fax or data modem call, then a task 412 may be performed. During task 412, interface component 120 associated with answer device 104 is suitably manipulated for compatibility with the technique selected in task 408, e.g., the G.711 PCM data transmission scheme. The processing associated with task 412 may be similar to the processing associated with task 408 (described above). In this manner, the connection between the two central offices has been converted to facilitate efficient modem data communication.

Interface component 120 associated with answer device 104 may also perform the calling signal analysis described above in connection with query task 406. Such redundant processing may be performed in lieu of the signaling described above in connection with task 410 or as a backup measure to ensure that calling signals are properly monitored, detected, and analyzed. Accordingly, such redundant processing may be performed whether or not interface component 114 detects a fax or data modem calling signal during query task 406. In response to a calling signal detection at interface component 120, ATM switch 118 may communicate with ATM switch 110 to identify the current data coding scheme and/or the current data transmission scheme (as described above).

If a facsimile modem call signal or a data modem call signal is not detected, then, for the time being, the default speech coder remains enabled. As described above, answer device 104 answers the call in an appropriate manner. For example, if the current call is a voice call, then answer device 104 may answer the call in response to an "off-hook" status of answer device 104. If the current call is a modem call, then any number of known answer signals or answer tones may be generated by, e.g., answer device 104. Such answer signals are sent back to calling device 102 to facilitate the establishment of the modem connection. As described above, the particular form of the answer signal may be dictated by the type of answer device 104.

While the answer tone is being generated and routed back to calling device 102, a query task 414 may be performed by interface component 120 and/or by interface component 114. In the preferred embodiment, query task 416 is at least initially performed by interface component 120 because any answer signals will be received by interface component 120 before being received by interface component 114. Query task 414 monitors the upstream signal for the presence of one or more answer signals. As described above in connection with FIG. 3, call/answer signal analyzer 302 may perform query task 414 to determine whether one of a plurality of distinctive answer signals has been generated by answer device 104. If query task 414 detects the presence of a facsimile modem answer signal or a data modem answer signal, then tasks 408, 410, and 412 (described above) may be performed to select the current speech coding scheme and/or data transmission protocol for use during the call. As mentioned above, in a practical embodiment, task 408 may convert the transmission protocol to the G.711 PCM scheme (or merely disable the default speech coder).

As described above with respect to the calling signals, it may be difficult or impossible for some answer signals to be transmitted by ATM switch 118 and/or received by ATM switch 110. Accordingly, if interface component 120 detects such an answer signal, then ATM switch 118 may signal ATM switch 110 in a suitable manner such that ATM switch 110 can emulate the answer signal for transmission to calling device 102.

In light of the modem answer signal detection performed during query task 414, a practical system need not perform the calling signal detection described above (query task 406). Furthermore, even if data communication system 100 detects a modem calling signal during query task 406, query task 414 may be performed as a confirmation or backup scheme.

The description of the practical illustrative embodiment herein assumes that data modem calls and facsimile modem calls can be transmitted by data communication system 100 using the same transmission scheme, e.g., the PCM scheme set forth in ITU-T Recommendation G.711. Notwithstanding this aspect of the example system, the present invention may be utilized in an application where facsimile modem calls are transmitted in accordance with a different protocol than data modem calls. Indeed, the present invention may be modified in a suitable manner to flexibly support any number of different transmission protocols for any number of different call types.

In a practical embodiment, the detection sensitivity for a calling or answer signal associated with a facsimile modem call or a data modem call can be relatively high because the primary penalty for false detection of a modem call would be the use of unnecessary bandwidth to complete the call. Conversely, if a modem call is not detected, then the quality of the modem connection, e.g., the data rate, could suffer by a significant amount.

If query task 414 fails to detect one of the applicable answer signals, then data communication system 100 (particularly, interface component 120 and/or interface component 114) may assume that the current call is a voice call. This is a practical assumption because conventional voice calls do not have calling or answer signals associated therewith. Accordingly, a task 416 may be performed to cause data communication system 100 to either maintain the default speech coding technique or enable a different speech coding technique if desirable to do so. In a practical embodiment, task 416 may cause interface components 114 and 120 to maintain the 32 kbps G.726 speech coding scheme or convert the G.711 scheme to G.728, G.723.1, or the like. Alternatively, for certain operating conditions, task 416 may merely convert from the G.711 scheme to a G.726 scheme having a data rate that differs from the default 32 kbps G.726 speech coding scheme. As described above, task 416 may be carried out by data coding selector 304 in conjunction with database 306 (see FIG. 3).

Task 416 may select the particular type of speech coding scheme in response to one or more criteria. For example, to maintain high voice quality, it may not be desirable to utilize a G.726 data rate lower than 32 kbps. On the other hand, a G.726 data rate higher than 32 kbps may not result in a noticeable improvement in voice quality. Interface components 114 and 120 may include appropriate ADPCM (or other) encoders, decoders, and rate controllers as necessary to support the transmission protocol conversion described herein. Those skilled in the art will recognize that any number of performance metrics and system compatibility criteria may be relevant for purposes of selecting a particular speech coder.

In addition to task 416, data coding selection process 400 may include a task 418. During task 418, suitable components of data communication system 100, e.g., ATM switches 110 and 118 or interface components 114 and 120, perform silence detection and comfort noise generation as described above in connection with FIG. 3. The use of silence detection can further reduce the amount of network resources needed for the communication of voice calls.

In response to task 416, a task 420 may be performed such that the particular speech coding scheme and/or data transmission protocol is suitably identified to ATM switch 118, central office 122, and/or answer device 104. Task 420 may be similar to task 410 described above. In response to such identifying data, interface component 120 is suitably configured to utilize the same (or compatible) speech coding scheme in the upstream direction. Of course, if interface component 120 performs the protocol conversion, then task 420 can identify the protocol to ATM switch 110, central office 106, and/or calling device 102.

Assuming that interface component 114 is informed that the current call is a fax or data modem call, then a task 422 may be performed. During task 422, interface component 114 associated with answer device 102 is suitably manipulated for compatibility with the technique selected in task 416, e.g., the G.726 speech coding scheme. The processing associated with task 422 may be similar to the processing associated with task 416 (described above). In this manner, the connection between the two central offices has been converted to facilitate efficient modem data communication.

Coding selection process 300 is preferably performed prior to the establishment of a modem connection between two modem end devices and prior to any modem training procedures that may be associated with such modem end devices. In addition, process 300 is preferably performed before "content" data is transmitted between the two end devices. In the context of a practical voice call, such content data is associated with the voice data; in the context of a practical modem call, such content data is associated with the actual data being transmitted (rather than any initialization or control data).

In response to data coding selection process 400, a specific speech coding technique and/or a specific data transmission scheme is selected and both network switches can operate in a compatible mode. Thereafter, the current call (voice, facsimile modem, data modem, etc.) proceeds in accordance with the selected data communication protocols. In the preferred embodiment, the configuration of the data communication system is selected with a particular cost metric, e.g., transmission bandwidth, in mind. Accordingly, in a practical system, speech coding techniques can be implemented for voice calls over a communication line without compromising the quality of modem calls placed over the same line. Alternate embodiments may be configured such that other cost metrics and associated protocols are utilized.

The present invention has been described above with reference to a preferred embodiment. However, those skilled in the art will recognize that changes and modifications may be made to the preferred embodiment without departing from the scope of the present invention. These and other changes or modifications are intended to be included within the scope of the present invention, as expressed in the following claims.

What is claimed is:

1. A communication method for use by a first communication component placed between a first communication device and a packet network, where a second communication device initiates a call to said first communication device over said packet network, a second communication component being placed between said second communication device and said packet network, said communication method comprising:

receiving a startup signal by said first communication component from said first communication device in response to said call from said second communication device;

analyzing said startup signal by said first communication component;

determining said startup signal is a modem answer tone based on said analyzing; and signaling said second communication component by said first communication component to inform said second communication component of said modem answer tone, so that said second communication component emulates said modem answer tone, in response to said signaling from said first communication component, for transmission to said second communication device.

2. The method of claim 1, wherein said signaling is performed using a packet network protocol.

3. The method of claim 1, wherein said second communication component emulates an ANS answer tone.

4. The method of claim 1, wherein said second communication component emulates an ANSam answer tone.

5. The method of claim 1, wherein said first communication device is a data modem.

6. The method of claim 1, wherein said first communication device is a fax modem.

7. A communication method for use by a first communication component placed between a first communication device and a packet network, where a second communication device initiates a call to said first communication device over said packet network, a second communication component being placed between said second communication device and said packet network, said communication method comprising:

receiving a startup signal by said first communication component from said first communication device in response to said call from said second communication device;

analyzing said startup signal by said first communication component;

determining said startup signal is a modem answer tone based on said analyzing;

signaling said second communication component by said first communication component to inform said second communication component of said modem answer tone; and changing a speech coding scheme of said first communication component from a first speech coding scheme to a second speech coding scheme in response to said determining.

8. A communication method for use by a first communication component placed between a first communication device and a packet network, where a second communication device initiates a call to said first communication device over said packet network, a second communication component being placed between said second communication device and said packet network, said communication method comprising:

receiving a startup signal by said first communication component from said first communication device in response to said call from said second communication device;

analyzing said startup signal by said first communication component;

determining said startup signal is a modem answer tone based on said analyzing; and signaling said second communication component by said first communication component to inform said second communication component of said modem answer tone, so that said second communication component changes a speech coding scheme of said second communication component from a first speech coding scheme to a second speech coding scheme in response to said signaling.

9. A communication method for use by a first communication component placed between a first communication device and a packet network, where said first communication device initiates a call to a second communication device over said packet network, a second communication component being placed between said second communication device and said packet network, said communication method comprising:

receiving a startup signal by said first communication component from said first communication device after said first communication device initiates said call to said second communication device;

analyzing said startup signal by said first communication component;

determining said startup signal is a modem calling tone based on said analyzing;

signaling said second communication component by said first communication component to inform said second communication component of said modem calling tone; and changing a speech coding scheme of said first communication component from a first speech coding scheme to a second speech coding scheme in response to said determining.

10. The method of claim 9, wherein said signaling is performed using a packet network protocol.

11. The method of claim 9, wherein said first communication device is a data modem.

12. The method of claim 9, wherein said first communication device is a fax modem.

13. The method of claim 9, wherein said signaling is performed so that said second communication component emulates said modem calling tone, in response to said signaling from said first communication component, for transmission to said second communication device.

14. A communication method for use by a first communication component placed between a first communication device and a packet network, where said first communication device initiates a call to a second communication device over said packet network, a second communication component being placed between said second communication device and said packet network, said communication method comprising:

receiving a startup signal by said first communication component from said first communication device after said first communication device initiates said call to said second communication device;

analyzing said startup signal by said first communication component;

determining said startup signal is a modem calling tone based on said analyzing; and signaling said second communication component by said first communication component to inform said second communication component of said modem calling tone, so that said second communication component changes a speech coding scheme of said second communication component from a first speech coding scheme to a second speech coding scheme in response to said signaling.

15. A communication method for use by a first communication component placed between a first communication device and a packet network, where said first communication device initiates a call to a second communication device over said packet network, a second communication component being placed between said second communication device and said packet network, said communication method comprising:

receiving a signaling from said second communication component by said first communication component, wherein said signaling informs said first communication component of a modem answer tone generated by said second communication device;

emulating said modem answer tone in response to said signaling to provide an emulated answer tone; and transmitting said emulated modem answer tone to said first communication device.

16. The method of claim 15, wherein said signaling is performed using a packet network protocol.

17. The method of claim 15, wherein said emulating emulates an ANSam answer tone.

18. The method of claim 15, wherein said first communication device is a data modem.

19. The method of claim 15, wherein said first communication device is a fax modem.

20. The method of claim 15 further comprising: changing a speech coding scheme of said first communication component from a first speech coding scheme to a second speech coding scheme in response to said receiving.

21. A first communication component placed between a first communication device and a packet network, where a second communication device initiates a call to said first communication device over said packet network, a second communication component being placed between said second communication device and said packet network, said first communication component comprising:

a signal analyzer configured to receive a startup signal from said first communication device in response to said call from said second communication device, wherein said signal analyzer is further configured to analyze said startup signal and determine that said startup signal is a modem answer tone; and a protocol layer interface configured to signal said second communication component to inform said second communication component of said modem answer tone, so that said second communication component emulates said modem answer tone, in response to being signaled by said first communication component, for transmission to said second communication device.

22. The first communication component of claim 21, wherein said protocol layer interface signals said second communication component using a packet network protocol.

23. The first communication component of claim 21, wherein said second communication component emulates an ANS answer tone.

24. The first communication component of claim 21, wherein said second communication component emulates an ANSam answer tone.

25. The first communication component of claim 21, wherein said first communication device is a data modem.

26. The first communication component of claim 21, wherein said first communication device is a fax modem.

27. A first communication component placed between a first communication device and a packet network, where a second communication device initiates a call to said first communication device over said packet network, a second communication component being placed between said second communication device and said packet network, said first communication component comprising:

a signal analyzer configured to receive a startup signal from said first communication device in response to said call from said second communication device, wherein said signal analyzer is further configured to analyze said startup signal and determine that said startup signal is a modem answer tone;

a protocol layer interface configured to signal said second communication component to inform said second communication component of said modem answer tone; and a speech coder selector configured to change a speech coding scheme of said first communication component from a first speech coding scheme to a second speech coding scheme in response to determining that said startup signal is said modem answer tone.

28. A first communication component placed between a first communication device and a packet network, where a second communication device initiates a call to said first communication device over said packet network, a second communication component being placed between said second communication device and said packet network, said first communication component comprising:

a signal analyzer configured to receive a startup signal from said first communication device in response to said call from said second communication device, wherein said signal analyzer is further configured to analyze said startup signal and determine that said startup signal is a modem answer tone; and a protocol layer interface configured to signal said second communication component to inform said second communication component of said modem answer tone, so that said second communication component changes a speech coding scheme of said second communication component from a first speech coding scheme to a second speech coding scheme in response to being signaled by said first communication component.

29. A first communication component placed between a first communication device and a packet network, where said first communication device initiates a call to a second communication device over said packet network, a second communication component being placed between said second communication device and said packet network, said first communication component comprising:

a signal analyzer configured to receive a startup signal from said first communication device after said first communication device initiates said call to said second communication device, wherein said signal analyzer is further configured to analyze said startup signal and determine that said startup signal is a modem calling tone;

a protocol layer interface configured to signal said second communication component to inform said second communication component of said modem calling tone; and a speech coder selector configured to change a speech coding scheme of said first communication component from a first speech coding scheme to a second speech coding scheme in response to determining that said startup signal is said modem calling tone.

30. The first communication component of claim 29, wherein said protocol layer interface signals said second communication component using a packet network protocol.

31. The first communication component of claim 29, wherein said first communication device is a data modem.

32. The first communication component of claim 29, wherein said first communication device is a fax modem.

33. The first communication component of claim 29, wherein said signaling is performed so that said second communication component emulates said modem calling tone, in response to said signaling from said first communication component, for transmission to said second communication device.

34. A first communication component placed between a first communication device and a packet network, where said first communication device initiates a call to a second communication device over said packet network, a second communication component being placed between said second communication device and said packet network, said first communication component comprising:

a signal analyzer configured to receive a startup signal from said first communication device after said first communication device initiates said call to said second communication device, wherein said signal analyzer is further configured to analyze said startup signal and determine that said startup signal is a modem calling tone;

a protocol layer interface configured to signal said second communication component to inform said second communication component of said modem calling tone, so that said second communication component changes a speech coding scheme of said second communication component from a first speech coding scheme to a second speech coding scheme in response to being signaled by said first communication component.

35. A first communication component placed between a first communication device and a packet network, where said first communication device initiates a call to a second communication device over said packet network, a second communication component being placed between said second communication device and said packet network, said first communication component comprising:

a protocol layer interface configured to receive a signaling from said second communication component, wherein said signaling informs said first communication component of a modem answer tone generated by said second communication device; and a processor configured to emulate said modem answer tone in response to said signaling to provide an emulated answer tone;

wherein said processor transmits said emulated modem answer tone to said first communication device.

36. The first communication component of claim 35, wherein said protocol layer interface receives said signaling from said second communication component using a packet network protocol.

37. The first communication component of claim 35, wherein said processor emulates an ANSam answer tone.

38. The first communication component of claim 35, wherein said first communication device is a data modem.

39. The first communication component of claim 35, wherein said first communication device is a fax modem.

40. The first communication component of claim 35 further comprising: a speech coder selector configured to change a speech coding scheme of said first communication component from a first speech coding scheme to a second speech coding scheme in response to said signaling.

* * * * *